United States Patent [19]

Kleinschmidt et al.

[11] Patent Number: 5,025,146
[45] Date of Patent: Jun. 18, 1991

[54] OPTICAL SENSOR LINE OF AMORPHOUS OR POLYCRYSTALLINE PHOTOELECTRIC MATERIAL HAVING A PLURALITY OF SENSOR ELEMENTS

[75] Inventors: Peter Kleinschmidt, Munich; Gerhard Mader, Unterhaching, both of Fed. Rep. of Germany

[73] Assignee: Siemens Aktiengesellschaft, Munich, Fed. Rep. of Germany

[21] Appl. No.: 386,604

[22] Filed: Jul. 31, 1989

[30] Foreign Application Priority Data

Sep. 29, 1988 [DE] Fed. Rep. of Germany ....... 3833159

[51] Int. Cl.$^5$ ............................................ H01J 40/14
[52] U.S. Cl. ................................. 250/214 L; 356/223
[58] Field of Search ................... 356/223; 250/208.1, 250/208.2, 578, 226, 214 L; 354/427

[56] References Cited

U.S. PATENT DOCUMENTS 4,309,604 1/1982 Yoshikawa et al. ................. 250/226
4,660,075 4/1987 Hashimoto et al. ................. 356/223

Primary Examiner—David C. Nelms
Attorney, Agent, or Firm—Hill, Van Santen, Steadman & Simpson

[57] ABSTRACT

Optical sensor line of amorphous or polycrystalline photo-electric material having a plurality of sensor elements. An optical sensor line of amorphous or polycrystalline photo-electric material having a plurality of sensor elements, whereby it is provided that a non-linear element is allocated to each sensor element as a converter that converts the photo-current ($i_{ph}$) of the associated sensor and which is proportional to the quantity of light incident on the sensor into a signal voltage ($u_s$) that is at least approximately proportional to the logarithm of the photo-current ($i_{ph}$).

36 Claims, 3 Drawing Sheets z.B. $u_1 = u_s/2$ oder $u_1 = u_s$

OPTICAL SENSOR LINE OF AMORPHOUS OR POLYCRYSTALLINE PHOTOELECTRIC MATERIAL HAVING A PLURALITY OF SENSOR ELEMENTS

BACKGROUND OF THE INVENTION

The present invention is directed to an optical sensor line of amorphous or polycrystalline photoelectric material having a plurality of sensor elements.

The photo currents of optical sensors rise approximately linearly with increasing luminous intensity, whereas the human eye logarithmically divides brightnesses into gray scales. As a result significantly more gray scales lie in the dark region in a prescribed photo-current interval than in the bright region.

The following problem is present when reading out optical scan lines with amorphous semiconductor sensors given high dynamics:

small signals that, for example, are smaller by a factor of 1000 than a maximum of the signals to be processed are submerged in switching signals and noise signals. A linear processing of the photo-currents in the dark region therefore yields a low gray scale resolution.

Previously, these problems were partially reduced with an optimum line management, with a pre-amplification with high levels and low output resistances and/or with a noise blanking.

In order to guarantee a digital data transmission of the gray scales having a high resolution in the dark region, a superfluously great plurality of gray scales results in the bright region when the gray scale division occurs linearly as was previously the standard approach.

SUMMARY OF THE INVENTION

An object of the present invention is to provide an optical sensor line of the type initially cited that does not have the disadvantage of a low gray scale resolution in the dark region and, further, minimizes the number of bits required for a digital data transmission and/or digital processing of the gray scale values.

The object of the present invention is achieved by an optical sensor line having a non-linear element allocated to every sensor element as a converter that converts the photo-current, which is proportional to the incident luminous flux for a given time unit, into a signal voltage that is at least approximately proportional to the logarithm of the photo-current.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures in which like reference numerals identify like elements, and in which:

DESCRIPTION OF THE PREFERRED EMBODIMENT

Figure 1:
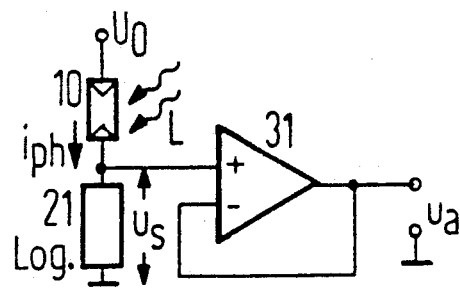
FIG. 1 is a circuit schematic of a first exemplary embodiment of the present invention having a sensor element, a converter allocated thereto and an operational amplifier.

FIG. 1 shows a first exemplary embodiment of the present invention having a sensor element 10, a converter 21 allocated thereto and an operational amplifier 31. The sensor element 10 has one of its terminals connected to a supply voltage terminal $U_O$. Its other terminal is connected both to the positive input of the operational amplifier 31 as well as to a first terminal of the converter 21 whose second terminal is connected to a grounded potential. Incident light L causes the sensor element 10 to output a photo-current $i_{ph}$ that flows toward ground through the converter 21. As a result of the V-I (voltage/current) characteristic of the converter 21, a signal voltage $u_s$ arises across the converter 21 that is at least approximately proportional to the logarithm of the photo-current $i_{ph}$ that is in turn proportional to the incident quantity of light.

The operational amplifier 31 represents an example of an impedance converter that makes the signal voltage available at the output with a level that is practically unaltered in comparison to the input signal, but with a significantly lower output resistance.

The sensor element 10 is preferably manufactured of amorphous silicon a-Si:H. A converter whose logarithmic V-I characteristic is defined by a pn-junction in a mono-crystalline semiconductor material can be used as converter 21. However, the converter 21 can also exploit the logarithmic V-I characteristic of a pn-junction in a polycrystalline semiconductor material. Finally, in accordance with a development of the present invention, it can also be provided that the converter 21 exploits the non-linear V-I characteristic of a layer sequence of one or more layers of amorphous material and of the appertaining electrode or appertaining electrodes.

In the described circuit arrangement of the first exemplary embodiment, the conversion of the photo-currents $i_{ph}$ into the non-linear voltage signal occurs before a signal amplification. A voltage drop that is proportional to the photo-current $i_{ph}$ is thereby generated across the converter 21 and has its output impedance modified or converted by the operational amplifier 31.

Figure 2:
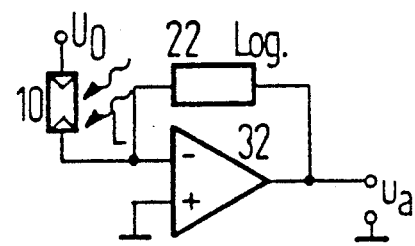
FIG. 2 is a circuit schematic of a further exemplary embodiment having a sensor element, an operational amplifier and a converter inserted into a feed back branch of the operational amplifier.

FIG. 2 shows a further exemplary embodiment having a sensor element 70, an operational amplifier 32 and a converter 22 inserted into a feedback branch of the operational amplifier 32.

The operational amplifier 32 here represents an example of an amplifier circuit in whose feedback branch the non-linear converter 22 is situated. The level of the output signal corresponds to that of the circuit of FIG. 1: however, the polarity of the signal is reversed.

Figure 3:
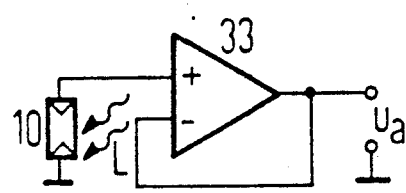
FIG. 3 is a circuit schematic of a further exemplary embodiment of the present invention having a sensor element that inherently has the function of the converter, and has an operational amplifier.

FIG. 3 shows a further exemplary embodiment of the present invention having a sensor element 10 that inherently has the function of the converter, and has an operational amplifier 33. The circuit of FIG. 3 operates in photo-voltaic operation, whereby the logarithmic conversion of the photo-current into an electrical voltage occurs in the sensor element 10.

In all three of the described circuit arrangements, an improvement of the present invention provides that at least two elements having non-linear V-I characteristics are connected in series for increasing the signal boost.

According to another improvement of the present invention, it is provided that the layer sequence is composed of amorphous silicon a-Si:H between two electrodes and that the amorphous silicon is n+-doped in the proximity of one of the electrodes. Preferably that electrode which lies at the n+-doped layer is composed of titanium. The other of the two electrodes is then expediently composed of palladium.

It is provided in another development of the present invention that the sensor element and the allocated converter form a physical unit, whereby the photovoltaic voltage is the signal voltage $u_s$ that is proportional to the logarithm of the incident quantity of light L (see FIG. 3).

According to a further development of the present invention, the layer sequence that was already set forth above can contain the photo-element and the converter-element in sandwich fashion.

Figure 4A:
FIGS. 4A, 4B, 4C, and 4D are circuit schematics each showing different executions for converters to be used according to the present invention.
Figure 4B:
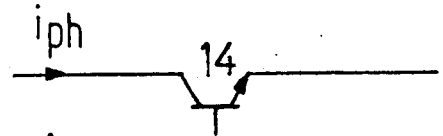

FIGS. 4A, 4B, 4C, and 4D each show respectively different embodiments for the converter functioning as a logarithmizer. FIG. 4A shows a diode 12 that is permeated by the photo-currents $i_{ph}$ in the conducting direction and that can have a crystalline or amorphous structure. FIG. 4B shows a further exemplary embodiment wherein a bipolar transistor 14 is operated in base circuitry, so that the photo-current $i_{ph}$ is logarithmized on the basis of the established characteristic of this bipolar transistor.

Figure 4C:
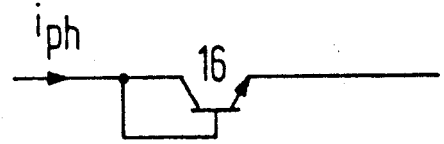

FIG. 4C shows a further exemplary embodiment of the converter element, whereby a bipolar transistor 16 that is connected as a diode is used.

Figure 4D:
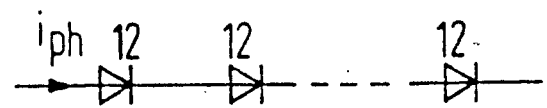

FIG. 4D, finally, shows an exemplary embodiment having a series circuit of logarithmizing elements that, for example, can be composed of a plurality of diodes 12 of FIG. 4A.

Figure 5:
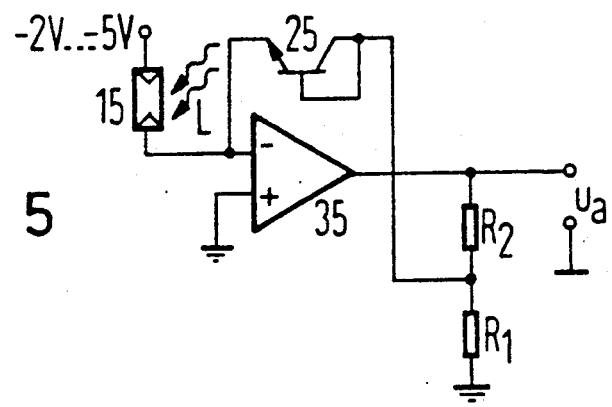
FIG. 5 is a circuit schematic of a first exemplary embodiment of a circuit arrangement that is provided per sensor element.
Figure 6:
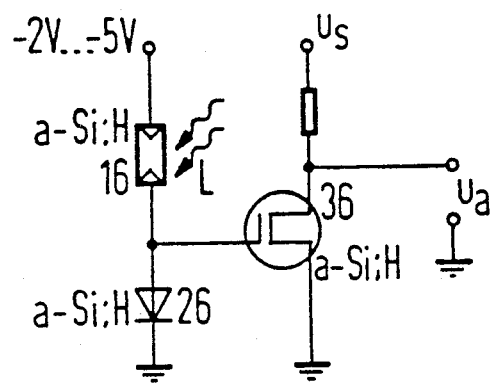
FIG. 6 is a circuit schematic of a second exemplary embodiment of a circuit arrangement that is provided per sensor element.
Figure 7:
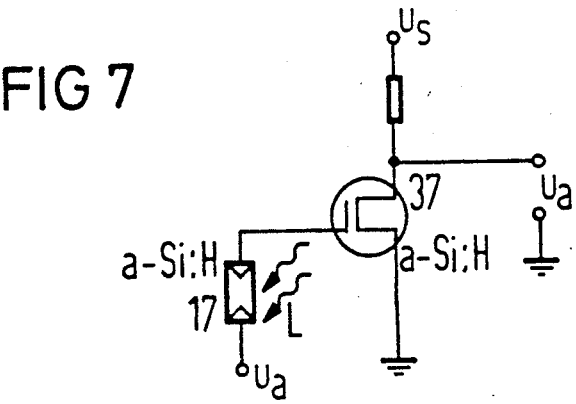
FIG. 7 is a circuit schematic of a third exemplary embodiment of a circuit arrangement that is provided per sensor element.
Figure 8:
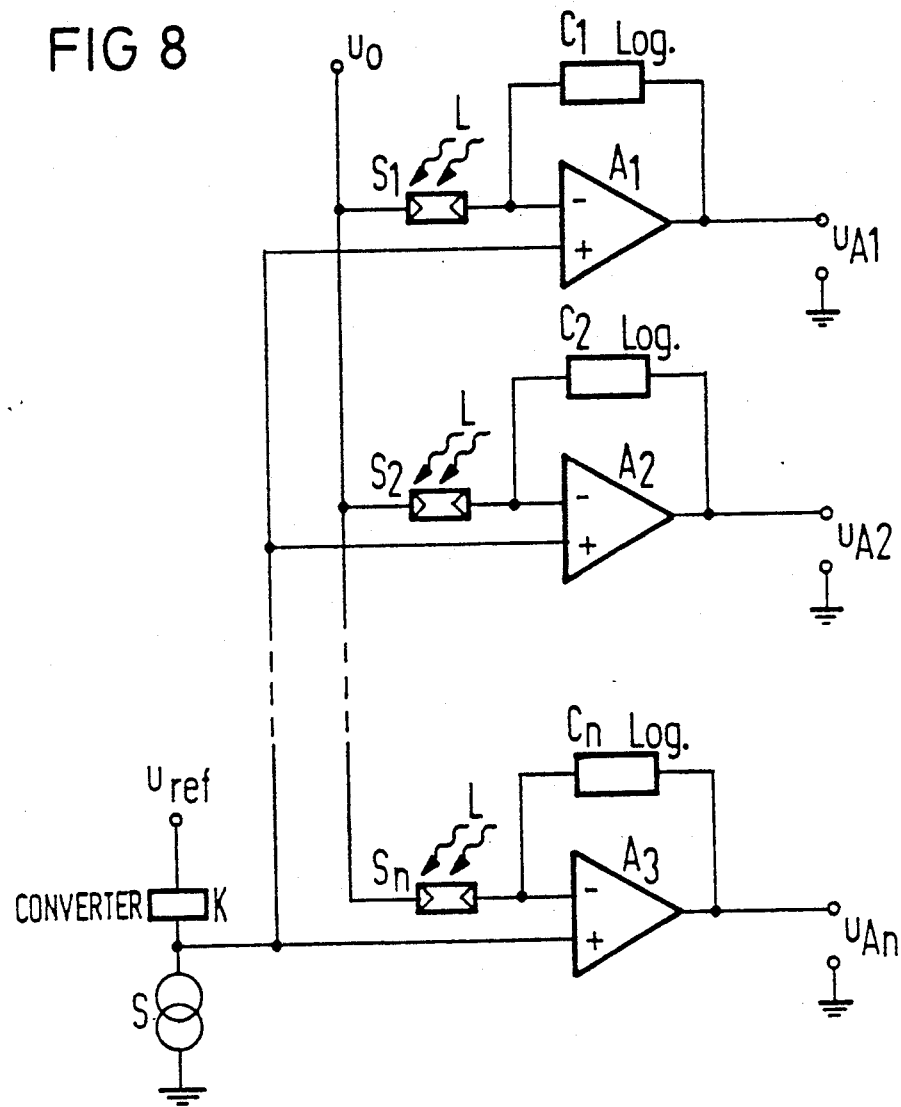
FIG. 8 is a circuit schematic of a preferred exemplary embodiment of a circuit arrangement having temperature compensation for a sensor line having n sensor elements.

FIGS. 5–7 show preferred exemplary embodiments of the inventive circuit for a respective sensor element. FIG. 5 depicts an amplifier circuit wherein the single amplifier 35 provides a signal Va available in low-impedance fashion at the output and also boosts its level in comparison to the voltage drop at the non-linear converter 25. The negative input of the amplifier 35 is connected to the sensor 15. FIG. 6 shows that both the non-linear converter 26 realized in the form of a diode as well as the amplifier 36 executed as a field effect transistor are constructed of amorphous silicon a-Si:H, i.e. of the same material. This has the advantage that the sensor 16, the converter 26 and the amplifier 36 can be manufactured in integrated fashion in a uniform technology. FIG. 7 shows a circuit wherein the sensor 17 is photo-voltaically operated, i.e. the photo-sensor and the logarithmizer form a physical unit. The amplifier 37 that is provided is again manufactured together with the sensor 17 in a uniform technology. (Note that $u_c$ can equal $u_s/2$ or $u_s$.) FIG. 8 shows a schematic illustration of a preferred exemplary embodiment of a sensor line having the inventive fashioning of the evaluation circuits for the sensor elements, $S_1 \ldots S_n$, whereby the temperature-dependency of the non-linear characteristics of the converters, $C_1 \ldots C_n$, in the individual evaluation circuits is compensated by a common compensation element having an identical converter K as in the evaluation circuits for n elements. Over and above this, a common zero point of the output signals can be determined by setting a potential $u_{ref}$ for the n elements.

As shown in FIG. 8 each of the amplifiers, $A_1 \ldots A_n$, has its negative input connected via its corresponding sensor, $S_1 \ldots S_n$, to a voltage $U_0$. Each positive input is connected to the junction of the converter K and a source S, the converter K also being connected to the reference voltage, potential $U_{ref}$. The outputs of the amplifiers, $A_1 \ldots A_n$, are $U_{A1} \ldots U_{An}$, respectively.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. An optical sensor line of amorphous or polycrystalline, photo-electric material having a plurality of sensor elements, comprising at least one non-linear element connected to every sensor element as a first converter that converts photo-current ($i_{ph}$) proportional to the incident quantity of light into a signal voltage ($u_s$) that is at least approximately proportional to the logarithm of the photo-current ($i_{ph}$), the sensor element outputting the photo-current ($i_{ph}$) as a function of the quantity of light incident on the sensor.

2. The optical sensor line according to claim 1, wherein the sensor elements are manufactured of amorphous silicon a-SiH.

3. The optical sensor line according to claim 1, wherein the converter converts the photo-current to the signal voltage according to the logarithmic V-I characteristic of a pn-junction in a mono-crystalline semiconductor material used to form the converter.

4. The optical sensor line according to claim 1, wherein the converter converts the photo-current to the signal voltage according to the logarithmic V-I characteristic of a pn-junction in a polycrystalline semiconductor material used to form the converter.

5. The optical sensor line according to claim 1, wherein the converter converts the photo-current to the signal voltage according to the non-linear V-I characteristic of a layer sequence of one or more layers of amorphous material used to form the converter and of appertaining electrodes of the converter.

6. The optical sensor line according to claim 1, wherein the signal voltage is amplified by a means for amplifying connected to the converter such that the conversion of the photo-current ($i_{ph}$) into the signal voltage is carried out before a signal amplification by the means for amplifying.

7. The optical sensor line according to claim 1, wherein the optical sensor line further comprises an amplifier having an input connected to the sensor element and to an output of the converter, that amplifies the photo-current ($i_{ph}$) before the conversion is performed, provided for the function of the converter.

8. The optical sensor line according to claim 7, wherein a voltage drop proportional to the photo-current ($i_{ph}$) is linearly pre-amplified, a means for providing the voltage drop connected to an output of the amplifier and to an input of the converter.

9. The optical sensor line according to claim 1, wherein the non-linear element is arranged in a feedback branch of an amplifier circuit, the non-linear element being connected between an input and output of the amplifier circuit.

10. The optical sensor line according to claim 1, wherein the non-linear element is a component part of the circuit structure of an amplifier; and causes the amplifier to have a non-linear amplification characteristic, the non-linear element being connected to an input of the amplifier.

11. The optical sensor line according to claim 1, wherein at least two non-linear elements for each sensor having non-linear V-I characteristics are connected in series for increasing the level of the signal voltage, a first terminal of the series connected non-linear elements being connected to the respective sensor element.

12. The optical sensor line according to claim 5, wherein the layer sequence between two electrodes is composed of amorphous silicon a-Si:H; and wherein the amorphous silicon is n+-doped in the proximity of one of the electrodes.

13. The optical sensor line according to claim 12, wherein the converter has two electrodes and wherein one of the two electrodes that is connected to the n+-doped layer is composed of titanium.

14. The optical sensor line according to claim 13, wherein the other of two electrodes is composed of palladium.

15. The optical sensor line according to claim 6, wherein the sensor element and the allocated converter form one physical unit, whereby a photo-voltaic voltage of the one physical unit is the signal voltage, $u_s$, that is proportional to the logarithm of the incident quantity of light.

16. The optical sensor line according to claim 5, wherein the layer sequence contains the sensor and the converter in sandwich fashion.

17. The optical sensor line according to claim 1, wherein the optical sensor line further comprises a second non-linear converter, identical to the first converter, that compensates for the temperature-dependency of the respective signal voltage and that is connected to every individual sensor element.

18. The optical sensor line according to claim 1, wherein the optical sensor line further comprises a second non-linear converter, identical to the first converter, that compensates for the temperature-dependency of the respective signal voltage and that is connected in common to a plurality of sensor elements.

19. The optical sensor line according to claim 1, wherein the optical sensor line further comprises a second non-linear converter, identical to the first converter, that compensates for the temperature-dependency of the respective signal voltage and that is connected to all sensor elements.

20. An optical sensor line of amorphous or polycrystalline, photo-electric material having a plurality of sensor elements, comprising at least one non-linear element connected to every sensor element as a first converter that converts photo-current ($i_{ph}$) proportional to the incident quantity of light into a signal voltage ($u_s$) that is at least approximately proportional to the logarithm of the photo-current ($i_{ph}$), the sensor element outputting the photo-current ($i_{ph}$) as a function of the quantity of light incident on the sensor, the non-linear element being arranged in a feedback branch of an amplifier circuit, and a second non-linear converter, identical to the first converter, that compensates for the temperature-dependency of the respective signal voltage being connected in common to a plurality of sensor elements.

21. The optical sensor line according to claim 20, wherein the sensor elements are manufactured of amorphous silicon a-SiH.

22. The optical sensor line according to claim 20, wherein the first converter converts the photo-current to the signal voltage according to the logarithmic V-I characteristic of a pn-junction in a mono-crystalline semiconductor material used to form the first converter.

23. The optical sensor line according to claim 20, wherein the first converter converts the photo-current to the signal voltage according to the logarithmic V-I characteristic of a pn-junction in a polycrystalline semiconductor material used to form the first converter.

24. The optical sensor line according to claim 20, wherein the first converter converts the photo-current to the signal voltage according to the non-linear V-I characteristic of a layer sequence of one or more layers of amorphous material used to form the first converter and of appertaining electrodes of the first converter.

25. The optical sensor line according to claim 20, wherein at least two non-linear elements for each sensor having non-linear V-I characteristics are connected in series for increasing the level of the signal voltage, a first terminal of the series connected non-linear elements being connected to the respective sensor element.

26. The optical sensor line according to claim 24, wherein the layer sequence between two electrodes is composed of amorphous silicon a-Si:H; and wherein the amorphous silicon is n+-doped in the proximity of one of the electrodes.

27. The optical sensor line according to claim 26, wherein the first converter has two electrodes and wherein one of the two electrodes that is connected to the n+-doped layer is composed of titanium.

28. The optical sensor line according to claim 27, wherein the other of two electrodes is composed of palladium.

29. An optical sensor line comprising:
a plurality of circuit stages, each having an output and each having an input connected to a voltage, $U_0$;
each of the circuit stages having a sensor having an input connected to the voltage, $U_0$, and an output providing a photo-current, $i_{ph}$, which is a function of a quantity of light incident upon the sensor, having an amplifier with positive and negative inputs and an output, a negative input thereof connected to the output of the associated sensor, and having a non-linear element having first and second terminals connected, respectively, to the negative input and to the output of the amplifier;
a converter, identical to the non-linear element of each of the circuit stages, connected to at least a potential ($U_{ref}$) and to the positive terminal of each of the amplifiers in the circuit stages; and signals on each of the outputs of the amplifiers being signals that are at least approximately proportional to the logarithm of the photo-current, $i_{ph}$.

30. The optical sensor line according to claim 29, wherein the sensor elements are manufactured of amorphous silicon a-SiH.

31. The optical sensor line according to claim 29, wherein each of the non-linear elements converts the photo-current to the signal voltage according to the logarithmic V-I characteristic of a pn-junction in a mono-crystalline semiconductor material used to form the non-linear elements.

32. The optical sensor line according to claim 29, wherein each of the non-linear elements converts the photo-current to the signal voltage according to the logarithmic V-I characteristic of a pn-junction in a polycrystalline semiconductor material used to form the non-linear elements.

33. The optical sensor line according to claim 29, wherein each of the non-linear elements converts the photo-current to the signal voltage according to the non-linear V-I characteristic of a layer sequence of one or more layers of amorphous material used to form the non-linear elements and of appertaining electrodes of the converter.

34. The optical sensor line according to claim 33, wherein the layer sequence between two electrodes is composed of amorphous silicon a-Si:H; and wherein the amorphous silicon is n+-doped in the proximity of one of the electrodes.

35. The optical sensor line according to claim 34, wherein each of the non-linear elements has two electrodes and wherein one of the two electrodes that is connected to the n+-doped layer is composed of titanium.

36. The optical sensor line according to claim 35, wherein the other of two electrodes is composed of palladium.

* * * * *